(12) United States Patent
Ronchini Ximenes et al.

(10) Patent No.: US 11,587,247 B1
(45) Date of Patent: Feb. 21, 2023

(54) SYNCHRONOUS EVENT DRIVEN READOUT OF PIXELS IN A DETECTOR FOR DIRECT TIME-OF-FLIGHT DEPTH SENSING

(71) Applicant: Meta Platforms Technologies, LLC, Menlo Park, CA (US)

(72) Inventors: Augusto Ronchini Ximenes, Seattle, WA (US); Michael Hall, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 370 days.

(21) Appl. No.: 16/838,691

(22) Filed: Apr. 2, 2020

Related U.S. Application Data

(60) Provisional application No. 62/828,826, filed on Apr. 3, 2019.

(51) Int. Cl.
*G06T 7/593* (2017.01)
*H04N 13/128* (2018.01)
*G02B 27/01* (2006.01)

(52) U.S. Cl.
CPC .......... *G06T 7/593* (2017.01); *G02B 27/0172* (2013.01); *H04N 13/128* (2018.05);
(Continued)

(58) Field of Classification Search
CPC ........ H04B 10/11; H04B 10/50; H04B 10/66; G06T 7/593; G02B 27/0172
See application file for complete search history.

(56) References Cited

U.S. PATENT DOCUMENTS 8,605,853 B2 * 12/2013 Schultz ................. H03M 1/123
377/118
8,917,388 B2 * 12/2014 Tenhunen ............. G01J 3/2803
356/301

(Continued)

FOREIGN PATENT DOCUMENTS

EP 3316497 A1 5/2018
EP 3451023 A1 3/2019

OTHER PUBLICATIONS

Dashman E., "The Engineering Essentials Behind LiDAR," Electronic Design, Apr. 9, 2021, 13 pages, Retrieved from the Internet: URL: https://www.electronicdesign.com/markets/automotive/article/21160813/on-semiconductor-the-engineering-essentials-behind-lidar.
(Continued)

*Primary Examiner* — Olga V Merkoulova
(74) *Attorney, Agent, or Firm* — Fenwick & West LLP

(57) ABSTRACT

A depth camera assembly (DCA) includes a direct time of flight system for determining depth information for a local area. The DCA includes an illumination source, a camera, and a controller. The illumination source projects light (e.g., pulse of light) into the local area. The camera detects reflections of the projected light from objects in the local area. The camera includes a detector where pixels are grouped into multiple macropixels that are coupled to an output bus. Specific macropixels from which information describing light detected by pixels in the specific macropixels is obtained. In come configurations, each macropixel includes a counter that is incremented based on detection of light by pixels in the macropixels. The counter may be used to select macropixels from which data is obtained.

20 Claims, 8 Drawing Sheets

(52) U.S. Cl.
CPC ............... *G02B 2027/0178* (2013.01); *G06T 2207/10028* (2013.01)

(56) References Cited

U.S. PATENT DOCUMENTS

| | | | |
|---|---|---|---|
| 10,097,264 B2* | 10/2018 | Venugopalan Nair Jalakumari .... | H04B 10/1143 |
| 10,116,925 B1* | 10/2018 | Wang ................. | H04N 5/37455 |
| 10,397,554 B2* | 8/2019 | Wang ..................... | G01S 7/4865 |
| 10,554,881 B2* | 2/2020 | Price ...................... | H04N 7/181 |
| 10,714,520 B1 | 7/2020 | Liu et al. | |
| 10,929,997 B1 | 2/2021 | Hall et al. | |
| 10,931,905 B2* | 2/2021 | Jin ........................... | G01S 17/36 |
| 11,196,229 B2* | 12/2021 | Lee ......................... | H02M 3/07 |
| 11,236,993 B1 | 2/2022 | Hall et al. | |
| 2013/0003911 A1* | 1/2013 | Schultz .................. | G11C 19/00 377/54 |
| 2013/0116049 A1 | 5/2013 | Pellman et al. | |
| 2014/0240492 A1 | 8/2014 | Lee | |
| 2016/0041264 A1 | 2/2016 | Dielacher et al. | |
| 2016/0054447 A1* | 2/2016 | Sun ........................ | G01S 17/10 356/5.01 |
| 2017/0180658 A1 | 6/2017 | Choi et al. | |
| 2018/0115364 A1* | 4/2018 | Venugopalan Nair Jalakumari .... | H04B 10/502 |
| 2018/0160041 A1* | 6/2018 | Price ..................... | G02B 19/009 |
| 2018/0323788 A1 | 11/2018 | Rae et al. | |
| 2018/0338127 A1* | 11/2018 | Wang ..................... | H04N 5/378 |
| 2019/0174120 A1* | 6/2019 | Wang ................. | H04N 5/36965 |
| 2019/0208150 A1* | 7/2019 | Jin ........................... | G01S 17/89 |
| 2019/0235351 A1 | 8/2019 | Lee et al. | |
| 2019/0393674 A1* | 12/2019 | Lee ..................... | H01S 5/06825 |
| 2020/0036944 A1 | 1/2020 | Zhu et al. | |
| 2020/0386890 A1 | 12/2020 | Oggier et al. | |
| 2021/0181316 A1 | 6/2021 | Zhu et al. | |
| 2021/0396886 A1* | 12/2021 | Ronchini Ximenes ..................... | G02B 27/017 |
| 2022/0018941 A1 | 1/2022 | Druml et al. | |

OTHER PUBLICATIONS

International Search Report and Written Opinion for International Application No. PCT/US2021/033023, dated Aug. 3, 2021, 13 Pages.

Non-Final Office Action dated Jun. 27, 2022 for U.S. Appl. No. 17/138,537, filed Dec. 30, 2020, 26 pages.

Onsemi., "SiPMs in Direct ToF Ranging Applications," White Paper, Semiconductor Components Industries, LLC, Aug. 2021, 17 pages, Retrieved from the Internet: URL: https://www.onsemi.com/pub/Collateral/TND6254-D.PDF?utm_source=blog&utm_medium=blog&utm_campaign=lidar-rangefinder&utm_content=link-tnd6254.

Zhang C., et al., "A 240 x 160 3D-Stacked SPAD dToF Image Sensor With Rolling Shutter and In-Pixel Histogram for Mobile Devices," IEEE Open Journal of the Solid-State Circuits Society, Oct. 8, 2021, vol. 22, pp. 3-11, Retrieved from the Internet: URL: https://ieeexplore.ieee.org/document/9565145.

* cited by examiner

SYNCHRONOUS EVENT DRIVEN READOUT OF PIXELS IN A DETECTOR FOR DIRECT TIME-OF-FLIGHT DEPTH SENSING

CROSS-REFERENCE TO RELATED APPLICATIONS

This application claims the benefit of U.S. Provisional Application No. 62/828,826 filed Apr. 3, 2019, which is incorporated by reference in its entirety.

BACKGROUND

The present disclosure generally relates to depth sensing, and specifically relates increasing speed of readout of data from a detector in a direct time of flight sensor.

Mapping an environment with high accuracy and resolution allows generation or more immersive virtual reality (VR) or augmented reality (AR) content. Accurately mapping an environment surrounding a VR system or and AR system allows virtual objects to more realistically interact with real objects the environment surrounding the VR or AR system. For example, highly accurate mapping of an environment surrounding the VR or AR system allows a virtual object in a virtual environment to collide with real surfaces in the environment surrounding the VR or AR system or to appear occluded when the virtual object moves behind an opaque surface in the environment surrounding the VR or AR system.

SUMMARY

A depth camera assembly (DCA) determines depth information for one or more objects in a local area surrounding the DCA. In various embodiments, the DCA is included in a head mounted display (HMD) of a virtual reality system or of an augmented reality system. The DCA includes an illumination source, an imaging device, and a controller in various embodiments. In other embodiments, the DCA is a separate device detached from the HMD.

To accurately map an environment surrounding a VR system or an AR system, the VR system or AR system includes a depth camera. For inclusion in a head mounted display of a VR system or an AR system, such as depth camera should have a small form factor and low power consumption. Conventional depth cameras use structured light, which projects known patterns into the environment surrounding a depth camera, or indirect time of flight, which indirectly measures a round trip travel time of light projected into the environment surrounding the depth camera and returning to pixels on a sensor array based on a phase delay of an illumination pattern, such as a continuous wave illumination pattern or a pulsed illumination pattern, projected into the environment surrounding the depth camera.

Direct time-of-flight (dTOF) depth sensing configurations measure a roundtrip travel time of photons generated by multiple short pulses of light from an illumination source and synchronized with a detector. In many direct time-of-flight configurations, single-photon detectors are used, such as single-photon avalanche diodes (SPADs) are used. The depth to an object, or half of the travel distance, can then be extracted from the speed of light ($c \approx 3 \cdot 10^8$ m/s), according to $d = c/2 \cdot \tau$, where $\tau$ is the travel time. Direct time-of-flight allows multiple events (e.g., detections of photons) to be acquired in a histogram through a process called time-correlated single-photon counting (TCSPC), where the returning signal is accumulated around a charge accumulation bin coupled to detectors in a location corresponding to ae target location ($\tau_{target}$), while noise from internal and background illumination is uniformly distributed over the measurement range, allowing depth estimation under low signal to noise conditions.

In conventional detectors for depth camera assemblies (DCAs), a detector is read at a fixed frame rate. However, in direct time of flight configurations reading the detector data at the fixed frame rate causes high activity pixels in the sensor to be read less often, which may cause low quality depth reconstruction from information about photon detections by the high activity pixels that does not fully account for numbers of photon detection by the high activity pixels. Further, reading detector data at the fixed frame rate in direct time of flight implementations causes data from low activity pixels to be obtained more frequently, which may result in older photon detections to be identified multiple times.

To more efficiently obtain data from the detector of a DCA in direct time of flight configurations, the DCA includes an imaging device is configured to capture, in accordance with receiving instructions from the controller, one or more images of the local area including reflected light including portions of the outgoing light reflected from objects in the local area. The reflected light captured by the imaging device is reflected from the one or more objects in the local area. In various embodiments, the imaging device includes a detector comprising a two-dimensional array of pixels. However, in other embodiments, the imaging device includes a single detector or multiple detectors positioned relative to each other (e.g., a line of detectors). In various embodiments, each pixel includes a single photon avalanche diode (SPAD). Pixels of the detector are grouped into macropixels including a number of rows of pixels and a number of columns of pixels. In some embodiments, a macropixel includes an equal number of rows of pixels and columns of pixels. For example, a macropixel includes 16 rows of pixels and 16 columns of pixels, so the macropixel includes 256 pixels. However, in other embodiments, a macropixel includes any number of rows of pixels and columns of pixels. In some embodiments, each macropixel of the detector includes a common number of rows of pixels and includes a common number of columns of pixels.

Each macropixel of the detector is coupled to one or more readout buses, with a macropixel accessed via a column access control signal, a row access control signal, and an address of a pixel within the macropixel. In some embodiments, each macropixel is coupled to a single readout bus, while in other embodiments each macropixel is coupled to multiple parallel readout buses. A number of readout buses coupled to each macropixel may be determined by a desired readout speed for the detector. Accessing the macropixels using a row access control signal and a column access control signal increases a speed with which data is accessed from macropixels, allowing more accurate evaluation of data captured by the detector to more effectively identify photon detections by pixels of the detector.

Hence, in various embodiments, the detector includes an array of macropixels. Each macropixel comprises a plurality of pixels configured to capture light from the local area surrounding the detector. In some embodiments, each pixel in a macropixel is coupled to a time to digital converter (TDC) that is configured to generate a digital timestamp signal when the pixel coupled to the TDC captured light from the local area. One or more output buses coupled to various macropixels receive data from TDCs included in various macropixels. Based on one or more control signals, a macropixel of the array is selected. The detector may internally generate the control signals or receive the control signals form an external source. One or more output buses coupled to the selected macropixel are configured to receive data from TDCs coupled to pixels included in the selected macropixel.

Different pixels of the array, or groups of pixels of the array, are coupled to a plurality of aggregators, with different switches coupling a pixel, or a group of pixels, to different aggregators. The imaging device generates, or receives, control signals that activate a specific switch that couples the pixel or the group of pixels to an array of time to digital converters (TDC) coupled to individual pixels or to a TDC shared by multiple pixels of the group of pixels. This allows the imaging device to generate a coarse histogram of light detected by a pixel or a group of pixels using incrementing of the aggregators over time. The resulting coarse histogram may be used to subsequently select time intervals when the pixel or the group of pixels is coupled to the TDC by coarsely identifying a target within the local area from which light emitted by the DCA was reflected based on the aggregators rather than timing information from the TDC.

The imaging device may internally generate control signals that activate a specific switch that couples the pixel or the group of pixels to an array time to digital converters (TDC) coupled to individual pixels or to a TDC shared by pixels of the group of pixels at a specific time based on values of counters to which the pixel or group of pixels is coupled during different time intervals. In various embodiments, the imaging device couples the pixel or the group of pixels to different counters during different time intervals. A selector selects a counter having a maximum value and provides a control signal to a switch coupling the pixel or the group of pixels to the TDC during a time interval when the pixel or the group of pixels is also coupled to the counter having the maximum value. The imaging device determines that the counter having the maximum value corresponds to a location within the local area from which light emitted by the DCA was reflected. In some embodiments, the information identifying the corresponding counter suggesting the location within the local area is autonomously updated when a counter has a higher value than other counters or when a particular counter reaches a maximum value. Time to digital conversion is performed during time intervals when the counter having the maximum value is coupled to the pixel, or the group of pixels, but not when the pixel or the group of pixels is coupled to other counters.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereoscopic, or "stereo," video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

System Environment

Figure 1:
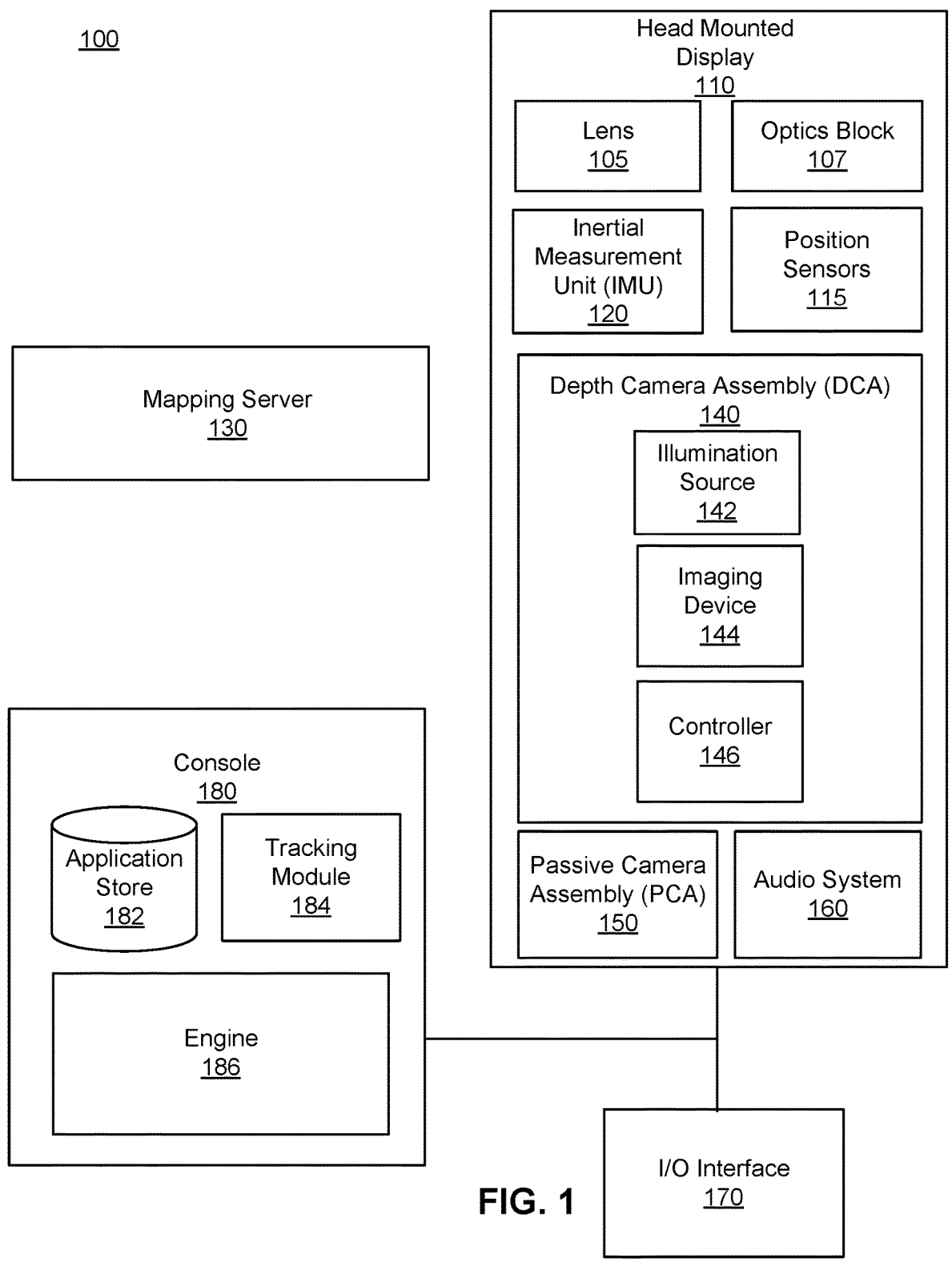
FIG. 1 is a block diagram of a system environment in which a console and a head mounted display (HMD) operate, in accordance with an embodiment.

FIG. 1 is a block diagram of one embodiment of a system environment 100 of a HMD 110. The system environment 100 may operate in an artificial reality environment, e.g., a virtual reality, an augmented reality, a mixed reality environment, or some combination thereof. The system 100 environment shown by FIG. 1 includes the HMD 110, a mapping server 130 and an input/output (I/O) interface 170 that is coupled to a console 180. While FIG. 1 shows an example system environment 100 including one HMD 110 and one I/O interface 180, in other embodiments any number of these components may be included in the system environment 100. For example, there may be multiple headsets 110 each having an associated I/O interface 170, with each HMD 110 and I/O interface 170 communicating with the console 180. In alternative configurations, different and/or additional components may be included in the system environment 100. Additionally, functionality described in conjunction with one or more of the components shown in FIG. 1 may be distributed among the components in a different manner than described in conjunction with FIG. 1 in some embodiments. For example, some or all of the functionality of the console 180 may be provided by the HMD 110.

The HMD 110 includes a lens 105, an optics block 107, one or more position sensors 115, an inertial measurement unit (IMU) 120, a depth camera assembly (DCA) 140 a passive camera assembly (PCA) 150, and an audio system 160. Some embodiments of the HMD 110 have different components than those described in conjunction with FIG. 1. Additionally, the functionality provided by various components described in conjunction with FIG. 1 may be differently distributed among the components of the HMD 110 in other embodiments, or be captured in separate assemblies remote from the HMD 110.

The lens 105 may include an electronic display that displays 2D or 3D images to the user in accordance with data received from the console 180. In various embodiments, the lens 105 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 107 magnifies image light received from the electronic display, corrects optical errors associated with the image light, and presents the corrected image light to a user of the HMD 110. In various embodiments, the optics block 107 includes one or more optical elements. Example optical elements included in the optics block 107 include: an aperture, a Fresnel lens, a convex lens, a concave lens, a filter, a reflecting surface, or any other suitable optical element that affects image light. Moreover, the optics block 107 may include combinations of different optical elements. In some embodiments, one or more of the optical elements in the optics block 107 may have one or more coatings, such as partially reflective or anti-reflective coatings.

Magnification and focusing of the image light by the optics block 107 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 107 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 107 corrects the distortion when it receives image light from the electronic display generated based on the content.

The IMU 120 is an electronic device that generates data indicating a position of the HMD 110 based on measurement signals received from one or more of the position sensors 115. A position sensor 115 generates one or more measurement signals in response to motion of the HMD 110. Examples of position sensors 115 include: one or more accelerometers, one or more gyroscopes, one or more magnetometers, another suitable type of sensor that detects motion, a type of sensor used for error correction of the IMU 120, or some combination thereof. The position sensors 115 may be located external to the IMU 120, internal to the IMU 120, or some combination thereof.

The DCA 140 generates depth image data of a local area, such as a room. Depth image data includes pixel values defining distance from the DCA 140, providing a mapping of locations captured in the depth image data, such as a three-dimensional mapping of locations captured in the depth image data. The DCA 140 includes an illumination source 142, an imaging device 144, and a controller 146. The illumination source 142 may project a structured light pattern or other light that is reflected off objects in the local area, and captured by the imaging device 144 or by the additional imaging device 146 to generate the depth image data.

For example, the illumination source 142 may project a plurality of structured light (SL) elements of different types (e.g. lines, grids, or dots) onto a portion of a local area surrounding the HMD 110. In various embodiments, the illumination source 142 comprises an emitter and a pattern plate. The emitter is configured to illuminate the pattern plate with light (e.g., infrared light). The illuminated pattern plate projects a structured light (SL_pattern comprising a plurality of SL elements into the local area. For example, each of the SL elements projected by the illuminated pattern plate is a dot associated with a particular location on the pattern plate.

Each SL element projected by the DCA 140 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 140 deforms as it encounters various surfaces and objects in the local area. The imaging device 144 is configured to capture one or more images of the local area. Each of the one or more images captured may include a plurality of SL elements (e.g., dots) projected by the illumination source 142 and reflected by the objects in the local area. The imaging device 144 may be a detector array, a camera, or a video camera.

The imaging device 144 includes a detector, as further described below in conjunction with FIGS. 5-11. In various embodiments, the detector includes circuitry that performs time gating on pixels of the detector to disable detection events away from a target location in the local area from which light from the illumination source 142 is reflected in the local area. This selective disabling of pixels of the detector reduces an amount of background light (i.e., detected light that is not emitted by the illumination source 142). Including circuitry in the detector, as further described below in conjunction with FIGS. 6-11, reduces power consumption by the imaging device 144 and increases a signal to noise ratio of timing information describing capture of light emitted by the illumination source 142, reflected by one or more objects in the local area, and captured by the imaging device 144.

The controller of the DCA 140 is coupled to the illumination source 142 and to the imaging device 144 and is configured to generate emission instructions for the illumination source 142. The controller of the DCA 140 provides the emission instructions components of the illumination source 142 to direct light emitted by the illumination source 142. Additionally, the controller 146 receives information from the imaging device 144 identifying a digital timestamp when the imaging device 144 detected light from the illumination source 142 reflected by one or more objects in the local area. From the digital timestamp and a time when the illumination source 142 emitted light into the local area, the controller 146 determines a distance from the DCA 140 to objects in the local area. In some embodiments, the DCA 140 identifies an object, or other target, in the local area and provides control signals to the imaging device 144 that identify time intervals when the imaging device 144 determines digital timestamps for detected light, as further described below in conjunction with FIGS. 6-8.

The PCA 150 includes one or more passive cameras that generate color (e.g., RGB) image data. Unlike the DCA 140 that uses active light emission and reflection, the PCA 150 captures light from the environment of a local area to generate image data. Rather than pixel values defining depth or distance from the imaging device, the pixel values of the image data may define the visible color of objects captured in the imaging data. In some embodiments, the PCA 150 includes a controller that generates the color image data based on light captured by the passive imaging device. In some embodiments, the DCA 140 and the PCA 150 share a common controller. For example, the common controller may map each of the one or more images captured in the visible spectrum (e.g., image data) and in the infrared spectrum (e.g., depth image data) to each other. In one or more embodiments, the common controller is configured to, additionally or alternatively, provide the one or more images of the local area to the audio system 160, to the console 180, or to any other suitable components.

The audio system 160 presents audio content to a user of the HMD 110 using a set of acoustic parameters representing an acoustic property of a local area where the HMD 110 is located. The audio system 160 presents the audio content to appear originating from an object (e.g., virtual object or real object) within the local area. The audio system 160 may obtain information describing at least a portion of the local area. In some embodiments, the audio system 160 may communicate the information to the mapping server 130 for determination of the set of acoustic parameters at the mapping server 130. The audio system 160 may also receive the set of acoustic parameters from the mapping server 130.

In some embodiments, the audio system 160 selectively extrapolates the set of acoustic parameters into an adjusted set of acoustic parameters representing a reconstructed impulse response for a specific configuration of the local area, responsive to a change of an acoustic condition of the local area being above a threshold change. The audio system 160 may present audio content to the user of the HMD 110 based at least in part on the reconstructed impulse response.

In some embodiments, the audio system 160 monitors sound in the local area and generates a corresponding audio stream. The audio system 160 may adjust the set of acoustic parameters, based at least in part on the audio stream. The audio system 160 may also selectively communicate the audio stream to the mapping server 130 for updating a virtual model describing a variety of physical spaces and acoustic properties of those spaces, responsive to determination that a change of an acoustic property of the local area over time is above a threshold change. The audio system 160 of the HMD 110 and the mapping server 130 may communicate via a wired or wireless communication channel.

The I/O interface 170 is a device that allows a user to send action requests and receive responses from the console 180. An action request is a request to perform a particular action. For example, an action request may be an instruction to start or end capture of image or video data, or an instruction to perform a particular action within an application. The I/O interface 170 may include one or more input devices. Example input devices include: a keyboard, a mouse, a game controller, or any other suitable device for receiving action requests and communicating the action requests to the console 180. An action request received by the I/O interface 170 is communicated to the console 180, which performs an action corresponding to the action request. In some embodiments, the I/O interface 170 includes the IMU 120, as further described above, that captures calibration data indicating an estimated position of the I/O interface 170 relative to an initial position of the I/O interface 170. In some embodiments, the I/O interface 170 may provide haptic feedback to the user in accordance with instructions received from the console 180. For example, haptic feedback is provided when an action request is received, or the console 180 communicates instructions to the I/O interface 170 causing the I/O interface 170 to generate haptic feedback when the console 180 performs an action.

The console 180 provides content to the HMD 110 for processing in accordance with information received from one or more of: the DCA 140, the PCA 150, the HMD 110, and the I/O interface 170. In the example shown in FIG. 1, the console 180 includes an application store 182, a tracking module 184, and an engine 186. Some embodiments of the console 180 have different modules or components than those described in conjunction with FIG. 1. Similarly, the functions further described below may be distributed among components of the console 180 in a different manner than described in conjunction with FIG. 1. In some embodiments, the functionality discussed herein with respect to the console 180 may be implemented in the HMD 110, or a remote system.

The application store 182 stores one or more applications for execution by the console 180. An application is a group of instructions, that when executed by a processor, generates content for presentation to the user. Content generated by an application may be in response to inputs received from the user via movement of the HMD 110 or the I/O interface 170. Examples of applications include: gaming applications, conferencing applications, video playback applications, or other suitable applications.

The tracking module 184 calibrates the local area of the system environment 100 using one or more calibration parameters and may adjust one or more calibration parameters to reduce error in determination of the position of the HMD 110 or of the I/O interface 170. For example, the tracking module 184 communicates a calibration parameter to the DCA 140 to adjust the focus of the DCA 140 to more accurately determine positions of SL elements captured by the DCA 140. Calibration performed by the tracking module 184 also accounts for information received from the IMU 120 in the HMD 110 and/or an IMU 120 included in the I/O interface 640. Additionally, if tracking of the HMD 110 is lost (e.g., the DCA 140 loses line of sight of at least a threshold number of the projected SL elements), the tracking module 184 may re-calibrate some or all of the system environment 100.

The tracking module 184 tracks movements of the HMD 110 or of the I/O interface 170 using information from the DCA 140, the PCA 150, the one or more position sensors 115, the IMU 120 or some combination thereof. For example, the tracking module 184 determines a position of a reference point of the HMD 110 in a mapping of a local area based on information from the HMD 110. The tracking module 184 may also determine positions of an object or virtual object. Additionally, in some embodiments, the tracking module 184 may use portions of data indicating a position of the HMD 110 from the IMU 120 as well as representations of the local area from the DCA 140 to predict a future location of the HMD 110. The tracking module 184 provides the estimated or predicted future position of the HMD 110 or the I/O interface 170 to the engine 186.

The engine 186 executes applications and receives position information, acceleration information, velocity information, predicted future positions, or some combination thereof, of the HMD 110 from the tracking module 184. Based on the received information, the engine 186 determines content to provide to the HMD 110 for presentation to the user. For example, if the received information indicates that the user has looked to the left, the engine 186 generates content for the HMD 110 that mirrors the user's movement in a virtual local area or in a local area augmenting the local area with additional content. Additionally, the engine 186 performs an action within an application executing on the console 180 in response to an action request received from the I/O interface 170 and provides feedback to the user that the action was performed. The provided feedback may be visual or audible feedback via the HMD 110 or haptic feedback via the I/O interface 170.

Head Mounted Display

Figure 2:
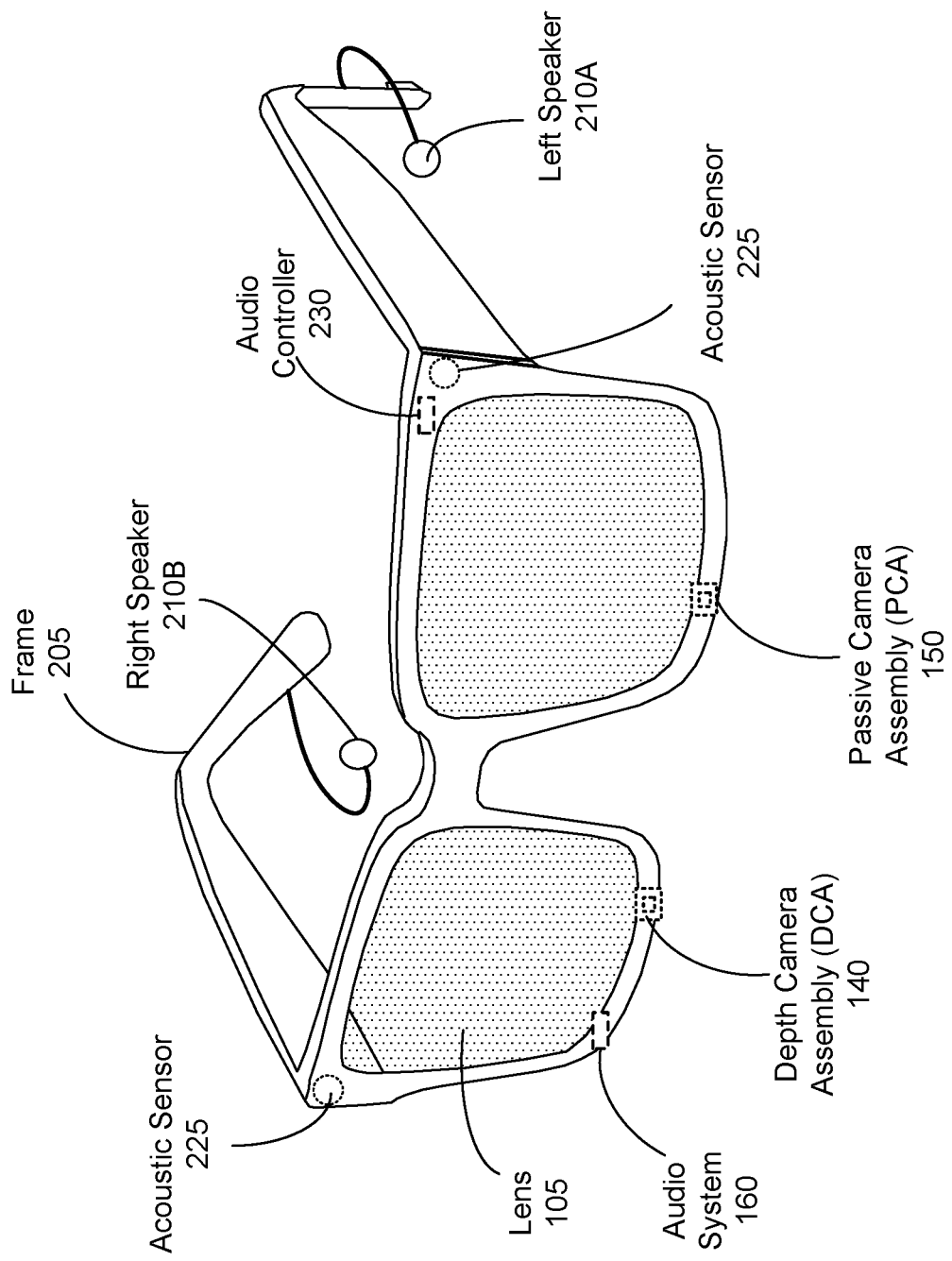
FIG. 2 is a diagram of a head-mounted display (HMD), in accordance with an embodiment.

FIG. 2 is a perspective view of the head mounted display (HMD) 110, in accordance with one or more embodiments. In some embodiments (as shown in FIG. 1), the HMD 110 is implemented as a NED. In alternate embodiments (not shown in FIG. 1), the headset 100 is implemented as an HMD. In general, the HMD 110 may be worn on the face of a user such that content (e.g., media content) is presented using one or both lenses 105 of the HMD 110. However, the HMD 110 may also be used such that media content is presented to a user in a different manner. Examples of media content presented by the HMD 110 include one or more images, video, audio, or some combination thereof. The HMD 110 may include, among other components, a frame 205, a lens 105, a DCA 140, a PCA 150, a position sensor 115, and an audio system 160. The audio system of the HMD 110 shown in FIG. 2 includes a left binaural microphone 210a, a right binaural microphone 210b, an array of acoustic sensors 225, an audio controller 230, one or more other components, or combination thereof. The audio system of the HMD 110 is an embodiment of the audio system 160 described above in conjunction with FIG. 1. The DCA 140 and the PCA 150 may be part of SLAM sensors mounted the HMD 110 for capturing visual information of a local area surrounding some or all of the HMD 110. While FIG. 2 illustrates the components of the HMD 110 in example locations on the HMD 110, the components may be located elsewhere on the HMD 110, on a peripheral device paired with the HMD 110, or some combination thereof.

The HMD 110 may correct or enhance the vision of a user, protect the eye of a user, or provide images to a user. The HMD 110 may be eyeglasses which correct for defects in a user's eyesight. The HMD 110 may be sunglasses which protect a user's eye from the sun. The HMD 110 may be safety glasses which protect a user's eye from impact. The HMD 110 may be a night vision device or infrared goggles to enhance a user's vision at night. The HMD 110 may be a near-eye display that produces artificial reality content for the user.

The frame 205 holds the other components of the HMD 110. The frame 205 includes a front part that holds the lens 105 and end pieces to attach to a head of the user. The front part of the frame 205 bridges the top of a nose of the user. The end pieces (e.g., temples) are portions of the frame 205 to which the temples of a user are attached. The length of the end piece may be adjustable (e.g., adjustable temple length) to fit different users. The end piece may also include a portion that curls behind the ear of the user (e.g., temple tip, ear piece).

The lens 105 provides or transmits light to a user wearing the HMD 110. The lens 105 may be prescription lens (e.g., single vision, bifocal and trifocal, or progressive) to help correct for defects in a user's eyesight. The prescription lens transmits ambient light to the user wearing the HMD 110. The transmitted ambient light may be altered by the prescription lens to correct for defects in the user's eyesight. The lens 105 may be a polarized lens or a tinted lens to protect the user's eyes from the sun. The lens 105 may be one or more waveguides as part of a waveguide display in which image light is coupled through an end or edge of the waveguide to the eye of the user. The lens 105 may include an electronic display for providing image light and may also include an optics block for magnifying image light from the electronic display, as further described above in conjunction with FIG. 1.

The DCA 140 captures depth image data describing depth information for a local area surrounding the HMD 110, such as a room. In some embodiments, the DCA 140 may include a light projector 142 (e.g., structured light and/or flash illumination for time-of-flight), a plurality of imaging devices (e.g., the imaging device 144 and the additional imaging device 146 in FIG. 1) plurality, and a controller 148, as described above in conjunction with FIG. 1. The captured data may be images captured by the imaging device of light projected onto the local area by the light projector. In one embodiment, the DCA 140 may include a controller and two or more imaging devices (e.g., cameras) that are oriented to capture portions of the local area in stereo. The captured data may be images captured by the two or more imaging devices of the local area in stereo. The controller of the DCA 140 computes the depth information of the local area using the captured data and depth determination techniques (e.g., structured light, time-of-flight, stereo imaging, etc.). Based on the depth information, the controller 148 of the DCA 140 determines absolute positional information of the HMD 110 within the local area. The controller 148 of the DCA 140 may also generate a model of the local area. The DCA 140 may be integrated with the HMD 110 or may be positioned within the local area external to the HMD 110. In some embodiments, the controller 148 of the DCA 140 may transmit the depth image data to the mapping server 130 via a network or other communication channel.

The PCA 150 includes one or more passive cameras that generate color (e.g., RGB) image data. Unlike the DCA 140 that uses active light emission and reflection, the PCA 150 captures light from the environment of a local area to generate color image data. Rather than pixel values defining depth or distance from the imaging device, pixel values of the color image data may define visible colors of objects captured in the image data. In some embodiments, the PCA 150 includes a controller that generates the color image data based on light captured by the passive imaging device. The PCA 150 may provide the color image data to the controller 148 of the DCA 140 for further processing or for communication to the mapping server 130.

The array of acoustic sensors 225 monitor and record sound in a local area surrounding some or all of the HMD 110. As illustrated in FIG. 2, the array of acoustic sensors 225 include multiple acoustic sensors with multiple acoustic detection locations that are positioned on the HMD 110. The array of acoustic sensors 225 may provide the recorded sound as an audio stream to the audio controller 230.

The position sensor 115 generates one or more measurement signals in response to motion of the HMD 110. The position sensor 115 may be located on a portion of the frame 205 of the HMD 110. The position sensor 115 may include a position sensor, an inertial measurement unit (IMU), or both. Some embodiments of the HMD 110 may or may not include the position sensor 115 or may include more than one position sensors 115. In embodiments in which the position sensor 115 includes an IMU, the IMU generates IMU data based on measurement signals from the position sensor 115. Examples of position sensor 115 include: one or more accelerometers, one or more gyroscopes, one or more magnetometers, another suitable type of sensor that detects motion, a type of sensor used for error correction of the IMU, or some combination thereof. The position sensor 115 may be located external to the IMU, internal to the IMU, or some combination thereof.

Based on the one or more measurement signals, the position sensor 115 estimates a current position of the HMD 110 relative to an initial position of the HMD 110. The estimated position may include a location of the HMD 110 and/or an orientation of the HMD 110 or the user's head wearing the HMD 110, or some combination thereof. The orientation may correspond to a position of each ear relative to a reference point. In some embodiments, the position sensor 115 uses the depth information and/or the absolute positional information from the DCA 140 to estimate the current position of the HMD 110. The position sensor 115 may include multiple accelerometers to measure translational motion (forward/back, up/down, left/right) and multiple gyroscopes to measure rotational motion (e.g., pitch, yaw, roll). In some embodiments, an IMU, further described above in conjunction with FIG. 1, rapidly samples the measurement signals and calculates the estimated position of the HMD 110 from the sampled data. For example, the IMU integrates the measurement signals received from the accelerometers over time to estimate a velocity vector and integrates the velocity vector over time to determine an estimated position of a reference point on the HMD 110. The reference point is a point that may be used to describe the position of the HMD 110. While the reference point may generally be defined as a point in space, however, in practice the reference point is defined as a point within the HMD 110.

The audio controller 230 provides audio instructions to one or more speakers for generating sound by generating audio content using a set of acoustic parameters (e.g., a room impulse response). The audio controller 230 presents the audio content to appear originating from an object (e.g., virtual object or real object) within the local area, e.g., by transforming a source audio signal using the set of acoustic parameters for a current configuration of the local area. The audio controller 230 receives information describing a sound pressure in an ear canals of the user when speakers of the HMD 110 are presenting audio data to the user from binaural microphone 210A and binaural microphone 210B. Based on the information from the binaural microphones 210A, 210B the audio controller 2230 calibrates one or more speakers, which receive audio instructions from the audio controller 230 to generate sounds. For example, a left speaker obtains a left audio channel from the audio controller 230, and a right speaker obtains and a right audio channel from the audio controller 230. In various embodiments, each speaker is coupled to an end piece of the frame 205, although in other embodiments the speakers, or a speaker array, are integrated into the frame 205 (e.g., in temples of the frame 205) to improve directionality of presented audio content.

The audio controller 230 may obtain visual information describing at least a portion of the local area, e.g., from the DCA 140 and/or the PCA 150. The visual information obtained at the audio controller 230 may include depth image data captured by the DCA 140. The visual information obtained at the audio controller 230 may further include color image data captured by the PCA 150. The audio controller 230 may combine the depth image data with the color image data into the visual information that is communicated (e.g., via a communication module coupled to the audio controller 230, not shown in FIG. 2) to the mapping server 130 for determination of a set of acoustic parameters. In one embodiment, the communication module (e.g., a transceiver) may be integrated into the audio controller 230. In another embodiment, the communication module may be external to the audio controller 230 and integrated into the frame 205 as a separate module coupled to the audio controller 230. In some embodiments, the audio controller 230 generates an audio stream based on sound in the local area monitored by, e.g., the array of acoustic sensors 225. The communication module coupled to the audio controller 420 may selectively communicate the audio stream to the mapping server 130 for updating the visual model of physical spaces at the mapping server 130.

Depth Camera Assembly

Figure 3:
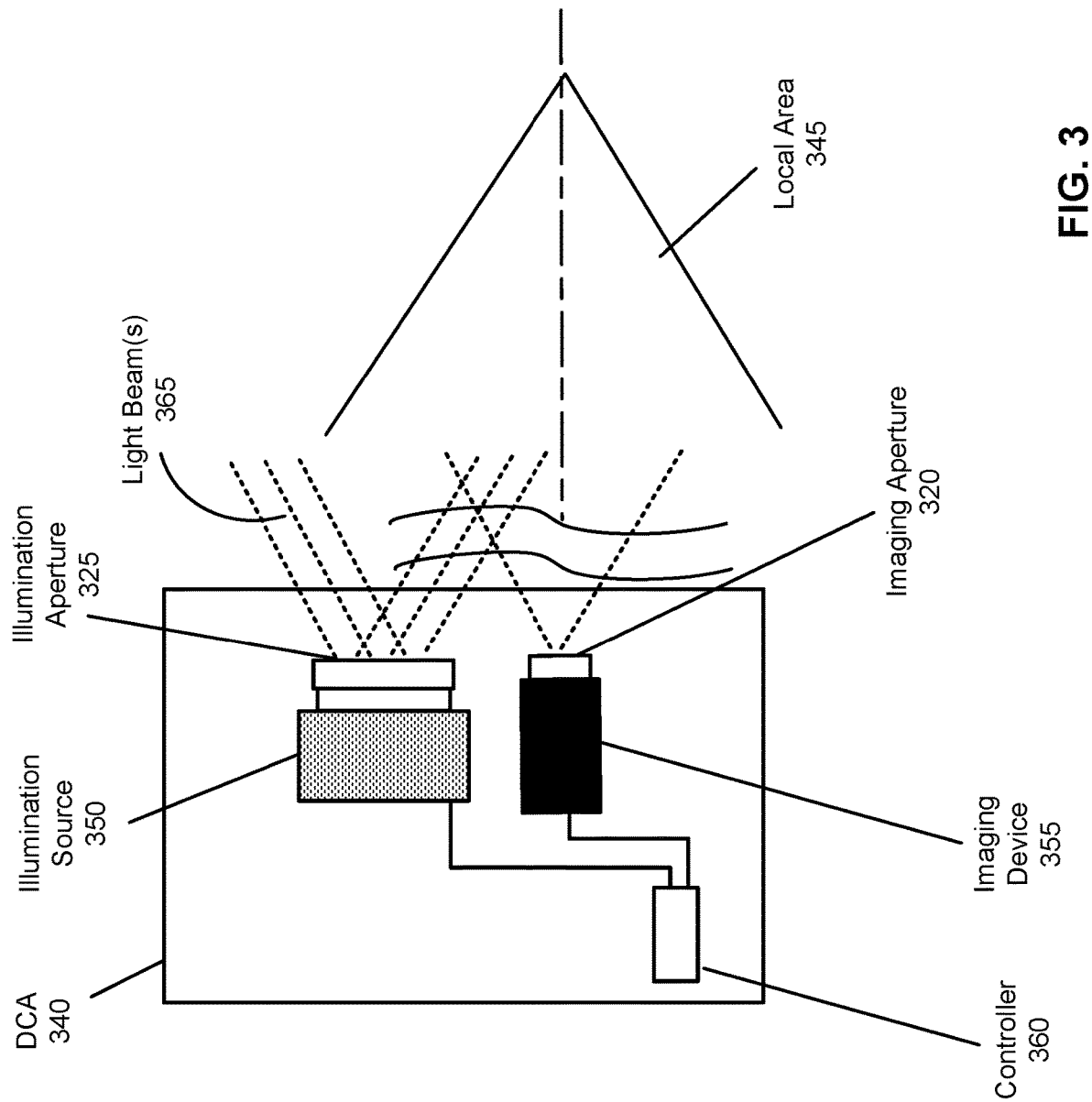
FIG. 3 is a cross section of a front rigid body of the head mounted display (HMD) in FIG. 2, in accordance with an embodiment.

FIG. 3 is block diagram of one embodiment of a depth camera assembly (DCA) 340, such as the DCA 140 shown in FIG. 1. In other embodiments, the DCA 340 includes different or additional components than those shown in FIG. 3. Further, in some embodiments, the DCA 340 combines functionalities of one or more components shown in FIG. 3 into fewer components.

The DCA 340 for determines depth information of one or more objects in a local area 345 surrounding some or all of the HMD 110. The DCA 340 includes an illumination source 350, an imaging device 355, and a controller 360 that may be coupled to both the illumination source 350 and to the imaging device 355. The illumination source 350 emits one or more light beams 365 through the illumination aperture 325. The illumination source 350 illuminates the local area 345 with the one or more light beams 365 in accordance with emission instructions generated by the controller 360. The illumination source 350 can be part of an illumination source of a beam steering assembly incorporated into the DCA 340, as further described in conjunction with FIG. 4.

The illumination source 350 may include a plurality of emitters that each emits light having certain characteristics (e.g., wavelength, polarization, coherence, pulse width, temporal behavior, etc.). Various emitters may have common characteristics or different characteristics, and the emitters can be operated simultaneously or individually. Example emitters include laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source 350 can emit the one or more light beams 365 that form a structured light pattern, e.g., a dot pattern. In some embodiments, the illumination source 350 includes a laser diode (e.g., infrared laser diode) and a polarizing element for generating the one or more light beams 365 as polarized light.

The imaging device 355 is configured to capture portions of the one or more light beams 365 reflected from the local area 345 through the imaging aperture 320. The imaging device 355 includes a detector (not shown in FIG. 3) implemented as a dense array of single photon avalanche diode (SPAD) pixels, as further described below in conjunction with FIGS. 5-7. The imaging device 355 may also include a polarization sensitive photodetector that uses, e.g., optically anisotropic materials to detect photons of a specific polarization, e.g., linear, circular, elliptical, etc. The imaging device 355 captures one or more images of one or more objects in the local area 345 illuminated with the one or more light beams 365. In various embodiments, the imaging device 355 has a focus that spreads captured light across a subset of the multiple SPAD pixels; hence, a point spread function of the imaging device 355 spreads light captured by the imaging device 355 across multiple SPAD pixels, creating a region of interest comprising the SPAD pixels onto which the imaging device 355 directs captured light; hence, the region of interest comprises a subset of the SPAD pixels included in the detector. In the preceding example, a size of the region of interest of SPAD pixels is determined based on an expected maximum or minimum range of the DCA 340 so the region of interest of SPAD pixels is sufficient for analog signal processing or digital histogram processing. As further described below in conjunction with FIG. 5, the detector of the imaging device 355 includes one or more macropixels in various embodiments. A macropixel is a group of pixels comprising a number of rows of pixels and a number of columns of pixels. The macropixels are coupled to a common output bus, with different macropixels accessed via a row access control signal, a column access control signal, and an address of a pixel within the macropixel (e.g., an identifier of a row and a column within the macropixel), which increases a speed at which detected photons may be retrieved from the detector. An example architecture of the detector including one or more macropixels is further described below in conjunction with FIGS. 5-7.

The controller 360 may control operation of certain components of the illumination source 350, based on the emission instructions. In some embodiments, the controller 360 may provide the emission instructions to a fine steering element (not shown in FIG. 3) and/or a coarse steering element (not shown in FIG. 3), within the illumination source 350 to control a field-of-view of the local area 345 illuminated by the one or more light beams 365. Additionally, the controller 360 is coupled to the imaging device 355 and provides control signals to a detector of the imaging device 355 to retrieve information describing photons detected by different pixels of the detector. As further described below in conjunction with FIGS. 5-7, control signals provided to the detector include a row access control signal or a column access control signal identifying a macropixel of the detector from which information describing numbers of photos detected by pixels is retrieved. From a time when the illumination source 350 emitted light into the local area 345 and one or more digital timestamps from the imaging device 355 identifying times when the imaging device 355 detected light emitted by the illumination source 350 and reflected from one or more objects in the local area 345, depth information to objects in the local area 345 reflecting light from the illumination source 350 may be determined.

The controller 360 is configured to determine depth information for the one or more objects in the local area 345 based at least in part on the captured portions of the one or more reflected light beams. In some embodiments, for depth sensing based on time-of-flight, the controller 360 determines the depth information based on charge stored in one or more accumulators associated with one or more SPAD pixels in the detector of the imaging device 355 over a defined amount of time. In some embodiments, the controller 360 provides the determined depth information to a console (not shown in FIG. 3) and/or an appropriate module of the HMD 110 (e.g., a varifocal module, not shown in FIG. 3). The console and/or the HMD 110 may use the depth information to generate content for presentation on the electronic display of the HMD 110 in various embodiments.

Figure 4:
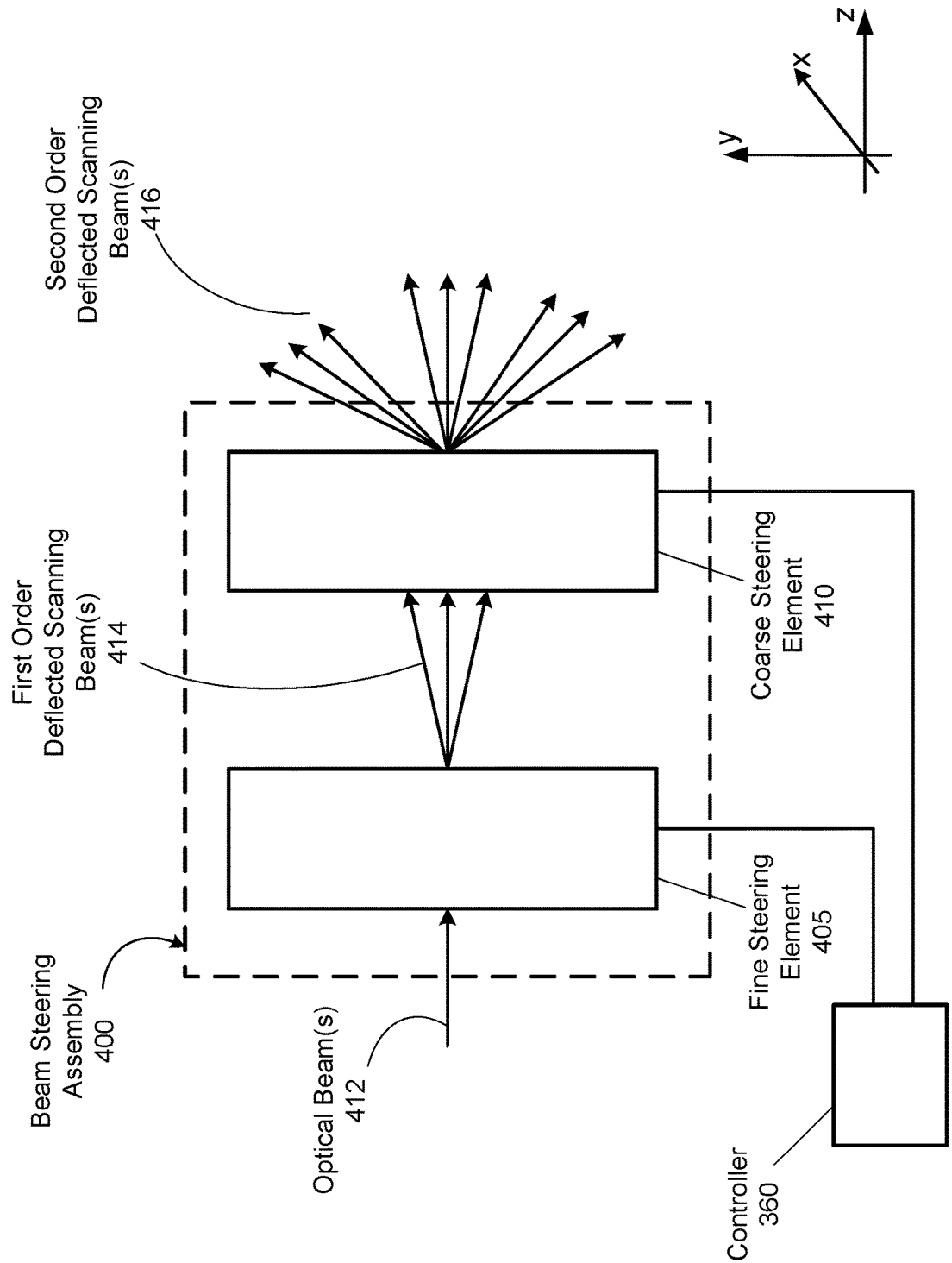
FIG. 4 is a beam steering assembly including a fine steering element and a coarse steering element, which may be integrated into a depth camera assembly (DCA), in accordance with an embodiment.

FIG. 4 illustrates an example beam steering assembly 400, which may be part of the DCA 340 in FIG. 3, in accordance with an embodiment. The beam steering assembly 400 cascades a fine steering element 405 with a coarse steering element 410. The fine steering element 405 deflects one or more optical beams 412 emitted from an illumination source (not shown in FIG. 4) to generate one or more first order deflected scanning beams 414. The fine steering element 405 may be configured to rapidly change a scanning angle of the one or more first order deflected scanning beams 414 over a limited range (e.g., between −10 degrees and +10 degrees), based in part on emission instructions from a controller 360. The fine steering element 405 is thus configured to operate at a high rate and can dwell or step adaptively, e.g., based in part on the emission instructions from the controller 360. It should be understood that deflection in relation to the fine steering element 405 is a general term that can also refer to other physical effects, such as refraction, reflection or diffraction, depending on an exact physical element used as the fine steering element 405.

In some embodiments, the fine steering element 405 can be implemented based upon one or more acousto-optic devices. In one embodiment, the fine steering element 405 is implemented as an acousto-optic deflector operating in the Bragg regime. In another embodiment, the fine steering element 405 is implemented as a surface acoustic wave (SAW) deflector. In yet another embodiment, the fine steering element 405 is implemented as a thin grating operating in the Raman-Nath regime. As another example, the fine steering element 405 is implemented using one dimensional or two dimensional optical phased array emitters, in which phase delays may be individually introduced for different emitters, allowing control of beam deflection. In general, the fine steering element 405 is configured to function as a dynamic diffraction grating that diffracts the one or more optical beams 412 to form the one or more first order deflected scanning beams 414 based in part on the emission instructions from the controller 360.

The coarse steering element 410 deflects the one or more first order deflected scanning beams 414 to generate one or more second order deflected scanning beams 416 to allow scanning over a large angular range, e.g., between −60 degrees and +60 degrees along both x and y dimensions (horizontal and vertical dimensions). It should be understood that deflection in relation to the coarse steering element 410 is a general term that can also refer to other physical effects, such as refraction, reflection or diffraction, depending on an exact physical element used as the coarse steering element 410. The one or more second order deflected scanning beams 416 represent an embodiment of the one or more light beams 465 emitted by the DCA 340 in FIG. 3. In some embodiments, the one or more second order deflected scanning beams 416 represent structured light having a dot pattern, a line pattern, or any other suitable pattern. By combining the fine steering element 405 providing a small angular spread with the coarse steering element 410 providing a larger angle deviation, the beam steering assembly 400 is flexible in that the one or more generated second order deflected scanning beams 416 can be projected in different areas of a volume. It should be understood that implementation requirements on the combination of fine steering element 405 and coarse steering element 410 may depend on specifications of performance and constraints related to the beam steering assembly 400. One particular implementation method can be chosen over another for different reasons, including ability to reach a particular angular range amplification from the fine steering element 405 to the coarse steering element 410 (e.g., amplification of six times), a switching speed, a power consumption, a size/weight of components of the beam steering assembly 400, etc.

In some embodiments, the coarse steering element 410 covers a wide range of rates. For example, a scanning speed of the coarse steering element 410 varies from matching that of the fine steering element 405 implemented based upon one or more acousto-optic devices (e.g., MHz scanning speed) to sub-kHz scanning speed. In one embodiment, the coarse steering element 410 is implemented based on scanning lenses. In another embodiment, the coarse steering element 410 is implemented as a liquid lens deflector. In yet another embodiment, the coarse steering element 410 is implemented based on polarization grating stacks. Examples of the beam steering assembly are further described in U.S. patent application Ser. No. 15/696,907, filed on Sep. 6, 2017, which is hereby incorporated by reference in its entirety.

Figure 5:
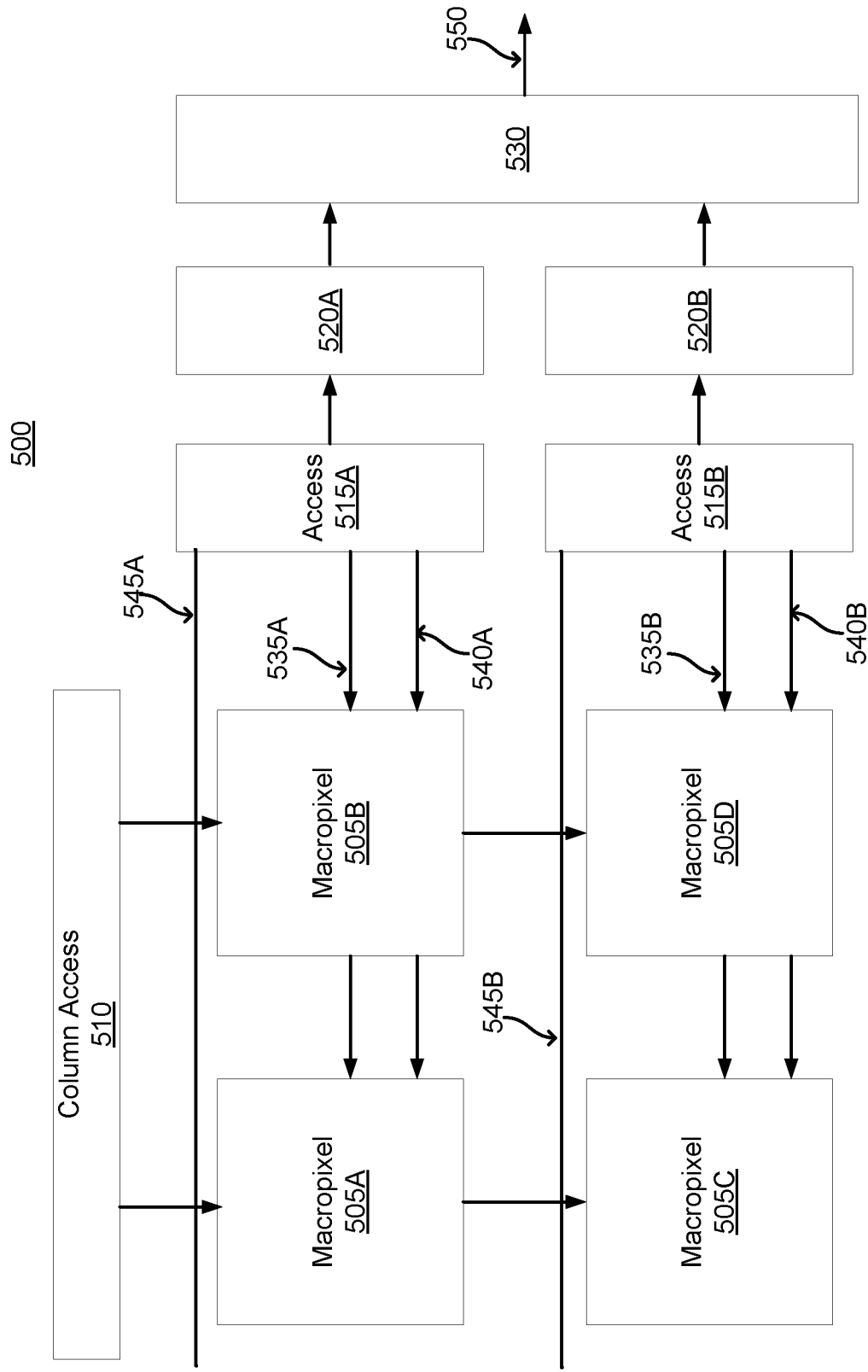
FIG. 5 is an example of a detector of an imaging device of a depth camera assembly (DCA) including macropixels, in accordance with an embodiment.

FIG. 5 illustrates one embodiment of a detector 500 of an imaging device 355 of a depth camera assembly (DCA) 340. In the example shown by FIG. 5, the detector 500 comprises a two-dimensional array of macropixels 505A-505D (also referred to individually and collectively using reference number 505). Each macropixel 505 includes a group of pixels, such as single photon avalanche diode (SPAD) pixels. Further, each macropixel 505 includes a number of rows of pixels and a number of columns of pixels. In various embodiments, a macropixel 505 includes a number of rows of pixels that equals a number of columns of pixels; for example, a macropixel 505 includes 16 rows of pixels and 16 columns of pixels, so the macropixel 505 includes 256 pixels. However, in other embodiments, a macropixel 505 includes a number of rows of pixels that differs from a number of columns of pixels. The macropixels 505 are arranged in rows and columns to simplify access to different macropixels 505. In the example of FIG. 5, macropixel 505A and macropixel 505B are in a row, while macropixel 505C and macropixel 505D are in another row. Similarly, macropixel 505A and macropixel 505C are in a column, while macropixel 505B and macropixel 505D are in another column.

Further, the detector 500 includes a column access module 510, access modules 515A, 515B (also referred to individually and collectively using reference number 515), compression modules 520A, 520B (also referred to individually and collectively using reference number 520), and a serialization module 530. The column access module 510 receives a column access control signal identifying a column of macropixels 505 from which data is retrieved. The column access module 510 receives a column access control signal including an identifier of a column including a macropixel 505 from which information identifying numbers of photos detected by pixels within the macropixel 505 is retrieved. The column access module 510 is coupled to each macropixel 505 through control lines corresponding to different columns of macropixels 505.

The access modules 515A, 515B receive a row access control signal identifying a row of macropixels 505 from which data is retrieved. In the example shown by FIG. 5, each row of macropixels 505 is coupled to a different access module 515. An access module 515A, 515B is coupled to macropixels 505 in a row corresponding to the access module 515A, 515B by a row control bus 535A, 535B. In the example of FIG. 5, access module 515A is coupled to macropixels 505A, 505B by row control bus 535A, while access module 515B is coupled to macropixels 505C, 505D by row control bus 535B. An access module 515 receives a row access control signal including an identifier of a row of macropixels coupled to the access module 515 to from which information identifying numbers of photos detected by pixels within the macropixel 505 is retrieved. Hence, column access control signals obtained by the column access module 510 and row access control signals obtained by one or more access modules 515 identify a column and a row, respectively, including a macropixel 505 from which information identifying numbers of photons detected by pixels within the macropixel 505 is retrieved. An output line 545A, 545B (also referred to individually and collectively using reference number 545) is coupled to each macropixel 505A-D, and information retrieved from a macropixel 505 corresponding to a row access signal and a column access signal is communicated to the access module 515 coupled to a row including the macropixel 505 via the output line 545A, 545B. While FIG. 5 shows an example implementation where a single output line 545A, 545B is coupled to a macropixel 505, in other embodiments, a macropixel 505 may be coupled to multiple parallel output lines.

Each access module 515 is also coupled to macropixels 505 in a row corresponding to the access module 515 by a pixel address bus 540A, 540B. An access module 515 identifies a pixel within the macropixel 505 via an address corresponding to the pixel within the macropixel, and transmits a request for data including the address to a macropixel 505, causing data from the pixel corresponding to the address describing photon detections by the pixel to be communicated to the access module 515 via an output line 545 coupled to the macropixel 505. Hence, the access module 515 retrieves data describing photon detections by different pixels within a macropixel 505 based on addresses of pixels within the macropixel 505. In various embodiments, an address of a pixel within a macropixel 505 is a sequence of bits, with different bit sequences corresponding to different pixels within the macropixel 505. For example, a macropixel 505 includes 16 rows of pixels and 16 columns of pixels, and an eight bit sequence is used to identify individual pixels within the macropixel 505. In different embodiments with different numbers of rows of pixels and columns of pixels in a macropixel 505 and parallel output lines, a different length sequence of bits is used to identify different pixels within a macropixel 505. For example, a sequence of bits having a length of a base 2 logarithm of a product of a number of rows in a macropixel 505 and a number of columns in the macropixel 505 is used to identify individual pixels within the macropixel 505. While FIG. 5 shows an example where the detector includes the column access module 510 and multiple access modules 515, in other embodiments, the detector 500 selects a macropixel 505 based on one or more control signals using any suitable method.

Each access module 515A, 515B is coupled to a compression module 520A, 520B. Hence, each row of macropixels 505 is coupled to a compression module 520 via the access module 515 coupled to a row including the macropixels 505. A compression module 520 removes certain data obtained from one or more pixels in a macropixel 505. For example, data extracted from a pixel includes a flag indicating whether the data is recent (occurring within a threshold amount of time from a current time) or old (occurring greater than the threshold amount of time from the current time), and a compression module 520 removes data extracted from pixels in a macropixel 505 having a flag indicating data extracted from pixels in the macropixel 505 is old. Determination of a flag for information captured by a pixel is further described below in conjunction with FIGS. 6 and 7. This allows a compression module 520 to remove data from pixels in a macropixel 505 that was captured by the pixels greater than a threshold amount of time from a time when the data is obtained from the pixels, reducing an amount of data transmitted from the detector 500 and improving accuracy of depth information determined from the data obtained from the macropixel 505. For example, a compression module 520 removes data from a pixel (e.g., a digital timestamp signal) having a flag indicating the data from the pixel is old. Hence, the compression module 520 outputs the flag indicating the data from the pixel is old, but not the data from the pixel. However, if the flag indicates data from a pixel is recent, the compression module 520 outputs both the flag indicating the data from the pixel is recent and the data from the pixel (e.g., a digital timestamp). This allows the compression module 520 to reduce the amount of data from a macropixel 505 transmitted via the output bus 550 by removing data indicated as old and transmitting the flag identifying the data as old in place of the old data from a pixel.

Figure 8:
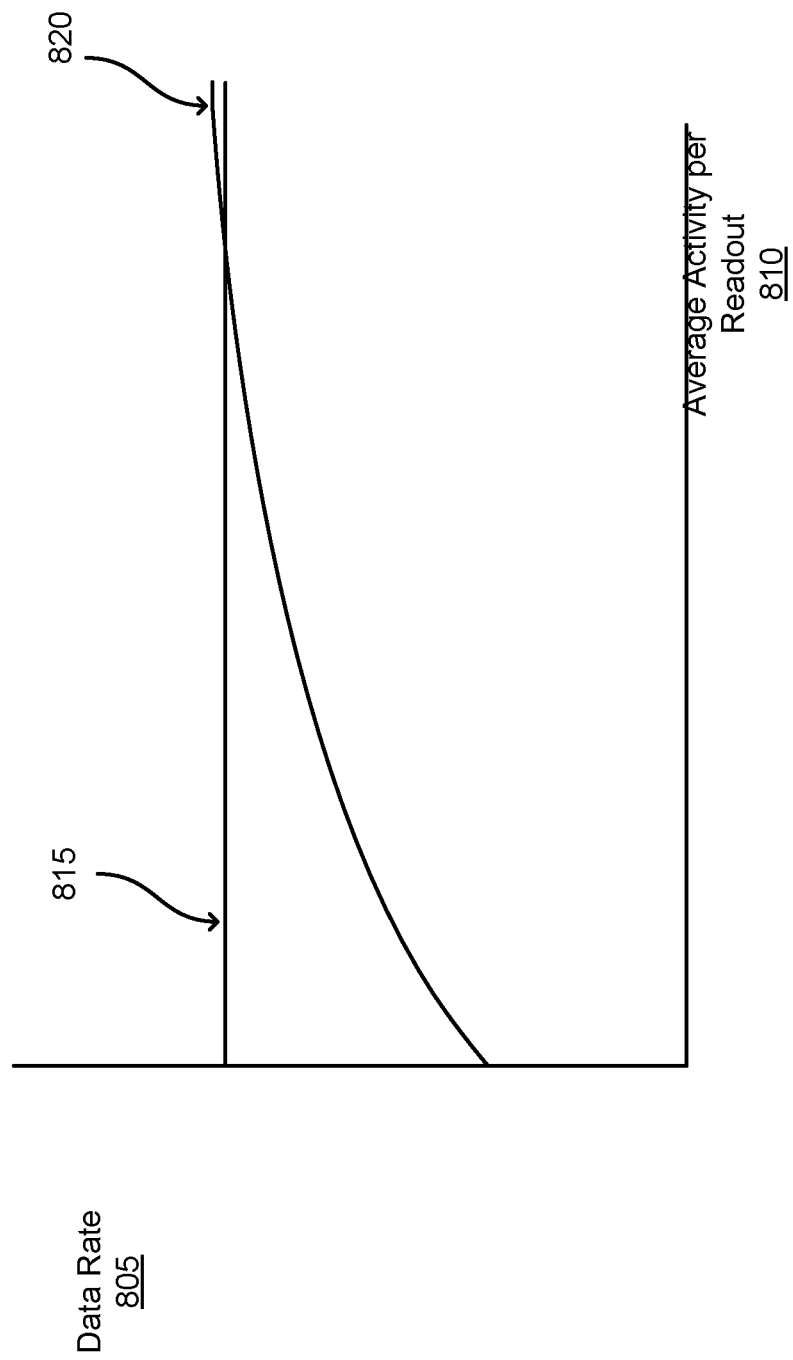
FIG. 8 is an example plot of a data rate of data retrieved from a detector of a depth camera assembly (DCA) relative to average activity of the detector, in accordance with an embodiment.

FIG. 8 shows a plot of a data rate 805 of data retrieved from a detector relative to average activity 810 of the detector. In FIG. 8, the average activity 810 of the detector is an average percentage of pixels of the detector that detect light. FIG. 8 shows that a conventional detector configured to synchronously obtain data from all pixels in the conventional detector 815 results in a constant data rate for obtaining data from pixels in the conventional detector for across each average activity of the conventional detector 815. However, for a detector 820 including macropixels, as further described in conjunction with FIG. 5, the data rate 810 for obtaining data from pixels in the detector 820 varies depending on the percentage of pixels of the detector 820 detecting light 815. As shown in FIG. 8, the data rate 810 for obtaining data from the detector 820 including macropixels increases as a greater percentage of pixels of the detector 820 including macropixels increases. However, as shown by FIG. 8, for the majority of activities of the detector 820 including macropixels, a lower data rate 810 is present to obtain data from the detector 820 relative to the constant data rate for obtaining data from the conventional detector 815 that synchronously obtains data from each pixel.

Referring back to FIG. 5, in various embodiments, each macropixel 505 includes a counter maintaining a count of a number of photon detections by pixels in the macropixel 505 having a flag indicating the photon detections are recent (i.e., indicating the photon detections occurred within a threshold amount of time from a current time). This allows a macropixel 505 to maintain a count of a number of recent photon detections by pixels within the macropixel 505. The controller 360 of the DCA may maintain a threshold number of recent photon detections and compare the count of the number of recent photon detections maintained by the counter of a macropixel 505 to the threshold number. In response to the number of recent photon detections stored in the counter of the macropixel 505 equaling or exceeding the threshold number, the controller 360 transmits a row access control signal and a column access control signal identifying the macropixel 505 to the detector 500 to obtain data describing photon detections by pixels in the macropixel 505. In various embodiments, the threshold number of recent photon detections is specified based on constraints on power consumption or constraints on a rate at which data is obtained from the detector 500. Hence, inclusion of a counter in a macropixel 505 allows the DCA 340 to more selectively obtain data from different macropixels 505 in the detector 500 based on numbers of recent photon detections by different macropixels 505.

The serialization module 530 is coupled to the compression modules 520 and to an output bus 550. The serialization module 530 combines data from multiple pixels into a serial data stream that is output to the controller 360 or to another processor via the output bus 550. For example, the serialization module 530 is a dual clock first-in first-out element that is populated with data obtained from pixels in a macropixel 505; as further described above, the data included in the serialization module 530 from a compression module 520 is limited to data from pixels in the macropixel 505 having a flag indicating data extracted from pixels in the macropixel 505 is recent. In various embodiments, the output bus 550 is a low voltage differential signaling (LVDS) channel allowing high-speed synchronous readout of data from the serialization module 550.

Figure 6:
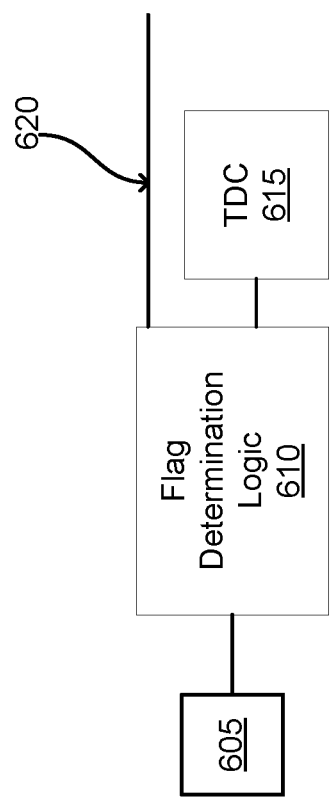
FIG. 6 is an example of a pixel of a detector of a depth camera assembly (DCA) coupled to flag generation logic, in accordance with an embodiment.

FIG. 6 is a block diagram of one embodiment of a pixel 605 of a detector of an imaging device 355 of a depth camera assembly (DCA) 340. In the example of FIG. 6, a single pixel 605 is shown for purposes of illustration. The pixel 605 is included in a macropixel 505 of the detector 500 further described above in conjunction with FIG. 5. As shown in FIG. 6, the pixel 605 is coupled to flag determination logic 610, which is coupled to a time to digital converter (TDC) 615.

The flag determination logic 610 determines a value of a flag 620 indicating whether a photon detection by the pixel 605 is recent or is old (i.e., whether the photon detection occurred within a threshold amount of time from a current time or whether the photon detection occurred greater than the threshold amount of time from the current time). In the example of FIG. 6, the flag 620 has a value when a photon detection by the pixel 605 occurred within a threshold amount of time from the current time (i.e., the photon detection is recent) and has an alternative value when the photon detection by the pixel 605 occurred greater than the threshold amount of time from the current time (i.e., the photon detection is old). For example, the flag 620 is a bit having a logical high value when the photon detection by the pixel 605 occurred within the threshold amount of time from the current time and having a logical low value when the photon detection by the pixel 605 occurred greater than the threshold amount of time from the current time. The flag 620 is output by the flag determination logic 610 and is combined with data from the TDC 615 when data is obtained from the pixel 605 to indicate whether the data from the TDC 615 was obtained within the threshold amount of time from the current time or was obtained greater than the threshold amount of time from the current time. An example of the flag determination logic 610 is further described below in conjunction with FIG. 7.

The TDC 615 generates a digital representation of a time when the TDC 615 receives current from the pixel 605 via the flag determination logic 610. Thus, the TDC 615 generates a digital timestamp when the TDC 630 obtained current from the pixel 605. The TDC 630 is also coupled to an output line of a macropixel 505 including the pixel 605 (e.g., output line 545 in FIG. 5), allowing the controller 360 to obtain the digital timestamp from the TDC via the output bus 550 of the detector 500 including the pixel 605, as further described above in conjunction with FIG. 5. Based on the digital timestamp from the TDC 615 and a time when the illumination source 350 of the DCA 340 emitted one or more light beams, the controller 360 determines depth information for objects in the local area of the HMD 110 including the DCA 340.

Figure 7:
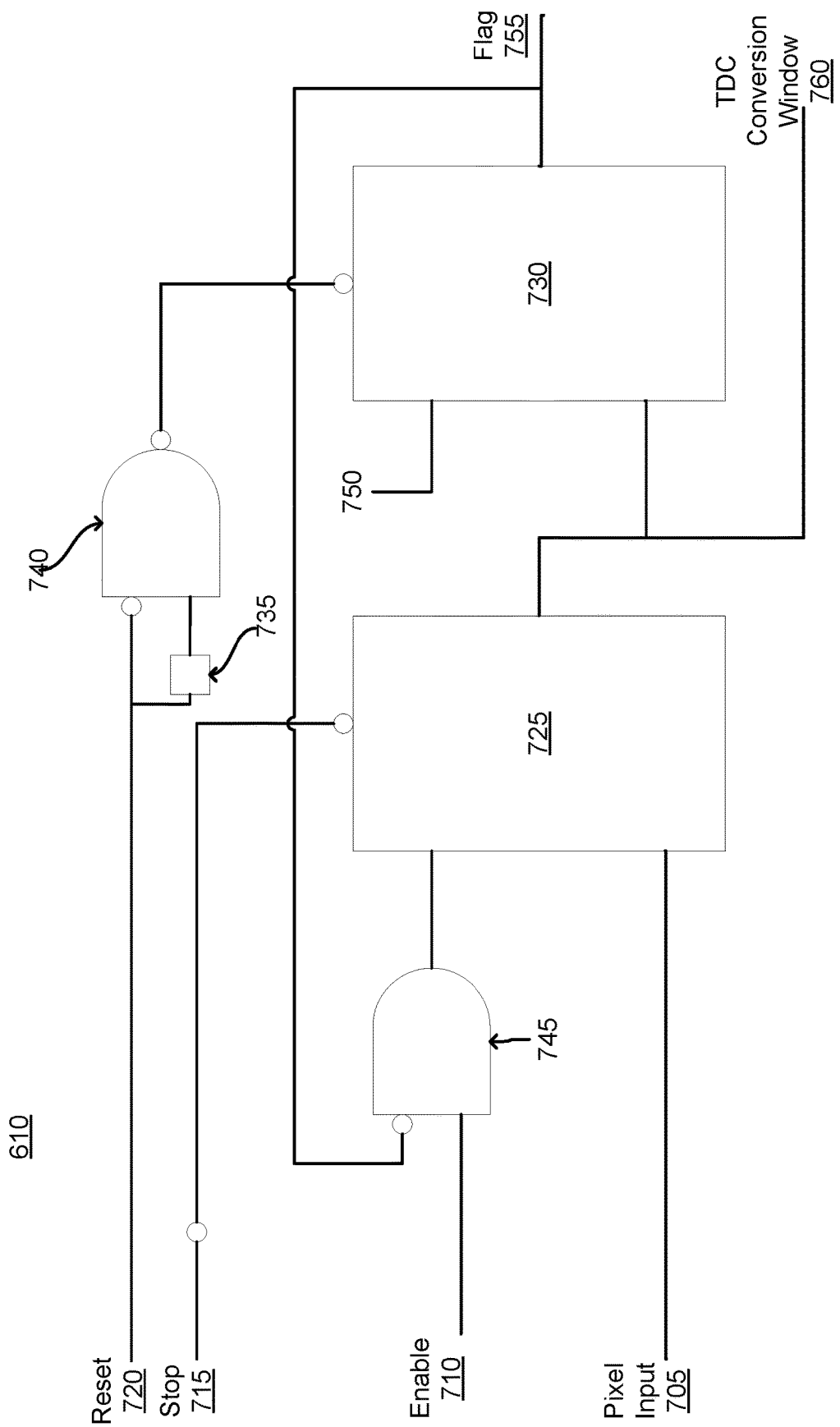
FIG. 7 is a logic diagram of circuitry of flag determination logic coupled to a pixel of a detector of a depth camera assembly (DCA), in accordance with an embodiment.

FIG. 7 is a logic diagram of circuitry of one embodiment of the flag determination logic 610. In the example of FIG. 7, the flag determination logic 610 receives an input signal 705 from a pixel 605 coupled to the flag determination logic 610. Additionally, the flag determination logic 610 receives an enable signal 710 to enable a time to digital converter (TDC) 615 coupled to the flag determination logic 610, as well as receives a reset signal 720 and a disable signal 715 to disable the (TDC) 615. In various embodiments, the enable signal 710, the disable signal 715, and the reset signal 720 are received from a controller 360 coupled to the imaging device 355 including the detector 500 in which the pixel 605 coupled to the flag determination logic 610 is included.

In the example of FIG. 7, the input signal 705 from the pixel output 605 is a clock input to a D flip-flip 725. An enable signal 710, from an external control and/or the autonomous gating peak detector, is an input to a logical AND gate 745, with an inverse of the flag 755 as the other input to the logical AND gate 745. The output of the logical AND gate 745 is a data input to the D flip-flop 725, so the output of the D flip-flop 725 is the output from the logical AND gate 745 when the input signal 705 from the pixel has a logical high value. The stop signal 715 is communicated to a time to digital converter (TDC), so the TDC converts a time difference between the input signal 705 and the stop signal 715 into a digital timestamp, by activating the TDC via TDC conversion window signal 760.

The output of the D flip-flop 725 is also a clock input to an additional D flip-flop 730, with an input to the additional D flip-flop 730 being a logical high signal 750. The output of the additional D flip-flop 730 is the flag 755. A reset signal to the additional D flip-flop 730 is an inverse of an output of a logical NAND gate 740, which has an inverse of the reset signal 720 as an input and an output of a delay element 735 that received the reset signal 720 as another input. Hence, the logical NAND gate 740 has the inverse of the reset signal 720 and the reset signal 720 delayed by a specified amount as its inputs to generate a negative pulse for resetting.

Thus, the flag determination logic 610 outputs the flag 755 indicating whether the data received from the pixel via the pixel input signal 705 was captured by the pixel 605 within a threshold amount of time from a current time, resulting in a logical high value for the flag 755, or was captured by the pixel 605 greater than the threshold amount of time from the current time, resulting in a logical low value for the flag 755. Additionally, the flag determination logic 610 outputs the TDC conversion window signal 769 to the TDC 615 to enable acquisition of the digital timestamp generated by the TDC 615 from the TDC 615.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
    an illumination source configured to illuminate a local area with outgoing light;
    an imaging device configured to capture one or more images of the local area including reflected light comprising portions of the outgoing light reflected from one or more objects in the local area, the imaging device including a detector comprising:
        an array of macropixels, each macropixel in the array comprising a plurality of pixels, each pixel of the plurality of pixels configured to capture light from the local area including portions of the outgoing light reflected from one or more objects in the local area at each of one or more time instants and coupled to a time to digital converter configured to generate a digital timestamp signal when a corresponding pixel of the plurality of pixels captures the light from the local area, each pixel of the plurality of pixels coupled to a flag determination circuit that generates a flag indicating whether the light captured from the local area was captured within a threshold amount of time from a current time,
        one or more access circuits configured to receive one or more control signals identifying a selected macropixel of the array of macropixels, and
        an output bus configured to receive data from each time to digital converter coupled to a pixel in the selected macropixel; and
    a controller coupled to the imaging device, the controller configured to:
        provide the one or more control signals to the imaging device identifying the selected macropixel, and
        receive the data from the selected macropixel via the output bus.

2. The DCA of claim 1, wherein the flag has a value indicating that the light captured from the local area was captured within the threshold amount of time from the current time and has an alternative value indicating that the light captured from the local area was captured greater than the threshold amount of time from the current time.

3. The DCA of claim 1, wherein each macropixel in the array includes a counter coupled to the flag determination circuit of each pixel of the plurality of pixels, the counter configured to maintain a count of a number of times light captured by the plurality of pixels was captured within the threshold amount of time from the current time.

4. The DCA of claim 3, wherein the controller is configured to obtain the count from the counter and to provide a control signal to the imaging device identifying each macropixel in the array in response to the count equaling or exceeding a threshold maintained by the controller.

5. The DCA of claim 1, wherein the selected macropixel is coupled to a compression circuit, the compression circuit configured to remove one or more digital timestamp signals from time to digital converters coupled to corresponding pixels included in the selected macropixel for which a corresponding flag determination circuit generated another flag indicating the corresponding pixels captured light from the local area greater than the threshold amount of time from the current time.

6. The DCA of claim 5, wherein the compression circuit is configured to output the other flag indicating the corresponding pixels captured the light greater than the threshold amount of time from the current time without a corresponding digital timestamp signal for pixels for which the corresponding flag determination circuit generated the other flag indicating the corresponding pixels captured the light from the local area greater than the threshold amount of time from the current time and is configured to output the flag indicating pixels captured light within the threshold amount of time from the current time in conjunction with a corresponding digital timestamp signal for pixels for which the corresponding flag determination circuit generated the flag indicating the corresponding pixels captured the light from the local area within the threshold amount of time from the current time.

7. The DCA of claim 5, wherein the compression circuit is coupled to a serialization circuit, the serialization circuit configured to combine data from multiple pixels in the selected macropixel into a serial data stream transmitted to the controller via the output bus.

8. The DCA of claim 1, wherein the one or more access circuits include a column access circuit coupled to a column of macropixels in the array.

9. The DCA of claim 8, wherein the one or more access circuits include a plurality of row access circuits, each row access circuit coupled to a row of macropixels in the array.

10. The DCA of claim 9, wherein the one or more control signals include a row access control signal identifying the row of macropixels and a column access control signal identifying the column of macropixels.

11. The DCA of claim 1, wherein the one or more control signals include information identifying individual pixels within the selected macropixel.

12. An imaging device comprising:
    an array of macropixels, each macropixel in the array comprising a plurality of pixels, each pixel of the plurality of pixels configured to capture light from the local area including portions of light emitted by an illumination source and reflected from one or more objects in the local area at each of one or more time instants and coupled to a time to digital converter configured to generate a digital timestamp signal when a corresponding pixel of the plurality of pixels captures the light from the local area, each pixel of the plurality of pixels coupled to a flag determination circuit that generates a flag indicating whether the light captured from the local area was captured within a threshold amount of time from a current time,
    one or more access circuits configured to receive one or more control signals identifying a selected macropixel of the array of macropixels; and
    an output bus configured to receive data from each time to digital converter coupled to a pixel in the selected macropixel.

13. The imaging device of claim 12, wherein the flag has a value indicating that the light captured from the local area was captured within the threshold amount of time from the current time and has an alternative value indicating that the light captured from the local area was captured greater than the threshold amount of time from the current time.

14. The imaging device of claim 13, wherein each macropixel in the array includes a counter coupled to the flag determination circuit of each pixel of the plurality of pixels, the counter configured to maintain a count of a number of times light captured by the plurality of pixels was captured within the threshold amount of time from the current time.

15. The imaging device of claim 12, wherein the selected macropixel is coupled to a compression circuit, the compression circuit configured to remove one or more digital timestamp signals from time to digital converters coupled to corresponding pixels included in the selected macropixel for which a corresponding flag determination circuit generated another flag indicating the corresponding pixels captured light from the local area greater than the threshold amount of time from the current time.

16. The imaging device of claim 15, wherein the compression circuit is coupled to a serialization circuit, the serialization circuit configured to combine data from multiple pixels in the selected macropixel into a serial data stream transmitted to the controller via the output bus.

17. The imaging device of claim 12, wherein the one or more access circuits include a column access circuit coupled to a column of macropixels in the array.

18. The imaging device of claim 17, wherein the one or more access circuits include a plurality of row access circuits, each row access circuit coupled to a row of macropixels in the array.

19. The imaging device of claim 18, wherein the one or more control signals include a row access control signal identifying the row of macropixels and a column access control signal identifying the column of macropixels.

20. The imaging device of claim 12, wherein the one or more control signals include information identifying individual pixels within the selected macropixel.

\* \* \* \* \*

UNITED STATES PATENT AND TRADEMARK OFFICE
CERTIFICATE OF CORRECTION

| | | |
|---|---|---|
| PATENT NO. | : 11,587,247 B1 | |
| APPLICATION NO. | : 16/838691 | |
| DATED | : February 21, 2023 | |
| INVENTOR(S) | : Augusto Ronchini Ximenes | |

It is certified that error appears in the above-identified patent and that said Letters Patent is hereby corrected as shown below:

On the Title Page

Item [57], Line 11, delete "In come" and insert -- In some --, therefor.

In the Claims

In Column 22, Claim 12, Line 49, delete "time," and insert -- time; --, therefor.

Signed and Sealed this
First Day of August, 2023

*Katherine Kelly Vidal*
Katherine Kelly Vidal
*Director of the United States Patent and Trademark Office*